US012442586B2

(12) United States Patent
Awachat et al.

(10) Patent No.: US 12,442,586 B2
(45) Date of Patent: Oct. 14, 2025

(54) REFRIGERATOR APPLIANCE

(71) Applicant: WHIRLPOOL CORPORATION, Benton Harbor, MI (US)

(72) Inventors: Abhishek Awachat, Pune (IN); Ruturaj Kadam, Pune (IN); George Theng Ching Ooi, Saint Joseph, MI (US); Shailesh Wani, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 113 days.

(21) Appl. No.: 18/086,982

(22) Filed: Dec. 22, 2022

(65) Prior Publication Data

US 2024/0210096 A1 Jun. 27, 2024

(51) Int. Cl.
*F25D 23/02* (2006.01)
*E05B 1/00* (2006.01)

(52) U.S. Cl.
CPC .......... *F25D 23/028* (2013.01); *E05B 1/0015* (2013.01); *F25D 23/021* (2013.01)

(58) Field of Classification Search
CPC ...... F25D 23/028; F25D 25/025; F25D 23/04; F25D 23/021; F25D 23/02; F25D 2400/18; A47B 95/02; A47B 88/944; A47B 88/906; A47B 2210/17; E05B 1/0015; E05B 65/0042; F24C 15/024
See application file for complete search history.

(56) References Cited

U.S. PATENT DOCUMENTS

| | | | | |
|---|---|---|---|---|
| 8,925,758 | B2 | 1/2015 | Benz et al. | |
| 10,018,218 | B2 * | 7/2018 | Jung | F16B 47/003 |
| 10,480,847 | B2 | 11/2019 | Heisswolf et al. | |
| 10,907,884 | B1 * | 2/2021 | Scorsim | F25D 23/028 |
| 2011/0273071 | A1 * | 11/2011 | Kim | F25D 23/028 312/405 |
| 2012/0104909 | A1 * | 5/2012 | Kaplan | F25D 23/028 312/204 |
| 2018/0320953 | A1 * | 11/2018 | Heisswolf | F25D 23/02 |
| 2019/0063820 | A1 * | 2/2019 | Read | F25D 23/028 |
| 2019/0078838 | A1 * | 3/2019 | Staud | F25D 25/025 |
| 2020/0408462 | A1 * | 12/2020 | Feldmeyer | F25D 25/025 |

(Continued)

FOREIGN PATENT DOCUMENTS

| | | | | |
|---|---|---|---|---|
| CN | 104279820 B | | 10/2016 | |
| CN | 108826812 A | * | 11/2018 | F25D 23/02 |
| CN | 210036014 U | * | 2/2020 | |

(Continued)

OTHER PUBLICATIONS

CN210036014 translation (Year: 2020).*

(Continued)

*Primary Examiner* — Hiwot E Tefera
(74) *Attorney, Agent, or Firm* — Brooks Kushman P.C.

(57) ABSTRACT

A door for a refrigerator appliance includes a first external panel, a ledge, a second external panel, and a protrusion. The ledge extends inward relative to the first external panel. The second external panel is offset from the first external panel and extends upward from the ledge to a top of the door. The protrusion extends upward from the ledge along the first external panel. A pocket handle is defined above the ledge and between the protrusion and the second external panel.

19 Claims, 4 Drawing Sheets

(56) References Cited

U.S. PATENT DOCUMENTS

| | | | | |
|---|---|---|---|---|
| 2023/0204278 A1* | 6/2023 | Lim | ........................ | E05B 17/00<br>16/412 |

FOREIGN PATENT DOCUMENTS

| | | | | | |
|---|---|---|---|---|---|
| CN | 111692822 | A | * | 9/2020 | |
| CN | 112728856 | A | * | 4/2021 | ............... E05B 1/00 |
| CN | 114646171 | A | * | 6/2022 | .............. F25D 11/02 |
| CN | 216977306 | U | * | 7/2022 | |
| CN | 115014035 | A | * | 9/2022 | ............. E05B 5/006 |
| DE | 102012200812 | A1 | | 7/2013 | |
| DE | 102020208158 | A1 | * | 12/2021 | ........... F25D 23/028 |
| EP | 2982917 | A1 | * | 2/2016 | ............. F25D 21/04 |
| EP | 3933318 | A1 | | 1/2022 | |
| KR | 950009352 | | * | 10/1995 | |
| WO | WO-2012139950 | A2 | * | 10/2012 | ........... F25D 23/028 |
| WO | WO-2013107662 | A2 | * | 7/2013 | ........... F25D 23/028 |

OTHER PUBLICATIONS

CN112728856 translation (Year: 2021).*
English translation CN108826812 (Year: 2018).*
English translation for WO-2012139950 (Year: 2012).*
English translation for WO2013107662 (Year: 2013).*
KR1995-0009352 translation (year: 1995).*

* cited by examiner

REFRIGERATOR APPLIANCE

TECHNICAL FIELD

The present disclosure relates to an appliance such as a refrigerator.

BACKGROUND

In order to keep food fresh, a low temperature must be maintained within a refrigerator to reduce the reproduction rate of harmful bacteria. Refrigerators circulate refrigerant and change the refrigerant from a liquid state to a gas state by an evaporation process in order cool the air within the refrigerator. During the evaporation process, heat is transferred to the refrigerant. After evaporating, a compressor increases the pressure, and in turn, the temperature of the refrigerant. The gas refrigerant is then condensed into a liquid and the excess heat is rejected to the ambient surroundings. The process then repeats.

SUMMARY

A refrigerator appliance includes a cabinet and a door. The cabinet defines an internal cavity. The door is secured to the cabinet and is configured to slide into an out of the internal cavity. The door has a front panel, a ledge extending inward relative to the front panel, an offset panel extending upward from a rear end of the ledge to a top of the door, and a protrusion extending upward from a front end of the ledge and the front panel. A pocket handle is defined above the ledge and between the protrusion and the offset panel. A lower end of the offset panel is sloped toward the front panel such that a back side of the pocket handle tapers away from the offset panel and toward the front panel along the lower end of the offset panel. An upper end of the protrusion is sloped toward the offset panel such that a front side of the pocket handle tapers away from the front panel and toward the offset panel along the upper end of the protrusion.

A door for a refrigerator appliance includes a first external panel, a ledge, a second external panel, and a protrusion. The ledge extends inward relative to the first external panel. The second external panel is offset from the first external panel and extends upward from the ledge to a top of the door. The protrusion extends upward from the ledge along the first external panel. A pocket handle is defined above the ledge and between the protrusion and the second external panel. An upper end of the protrusion extends toward the second external panel such that a front side of the pocket handle tapers away from the first external panel and toward the second external panel.

A door for a refrigerator appliance includes a front panel, a ledge, a recessed panel, and a protrusion. The ledge extends from a front to a rear end. The ledge also extends inward relative to the front panel. The front end of the ledge is proximate to the front panel. The recessed panel extends upward from the rear end of the ledge to a top of the door. The protrusion extends upward from the front end of the ledge. A pocket handle is defined between the protrusion and the recessed panel, and above the ledge. A lower end of the recessed panel extends toward the front panel such that a back side of the pocket handle tapers away from the recessed panel and toward the front panel.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
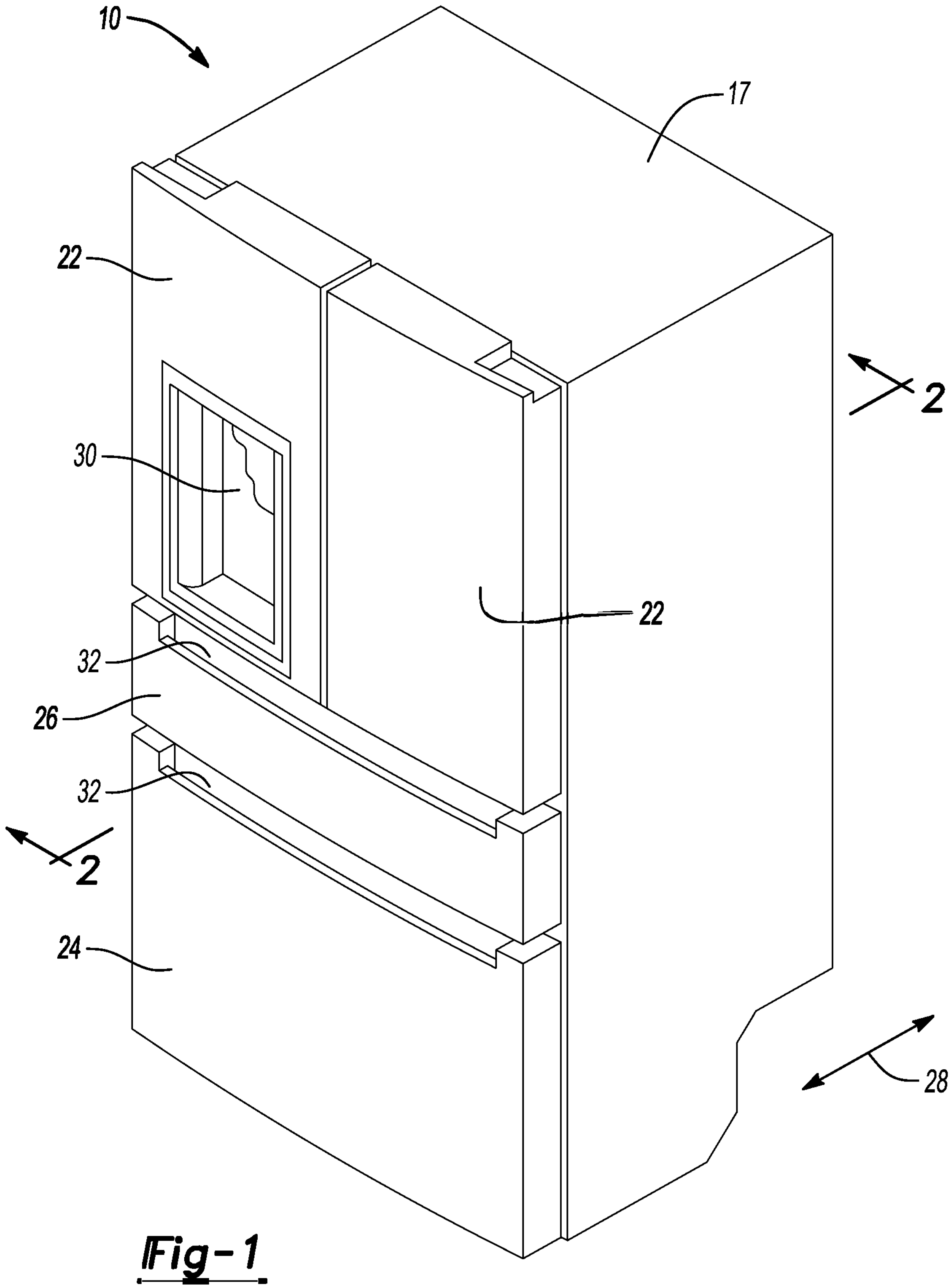
FIG. 1 is an elevated front view of a French-Door Bottom Mount type refrigerator appliance.
Figure 2:
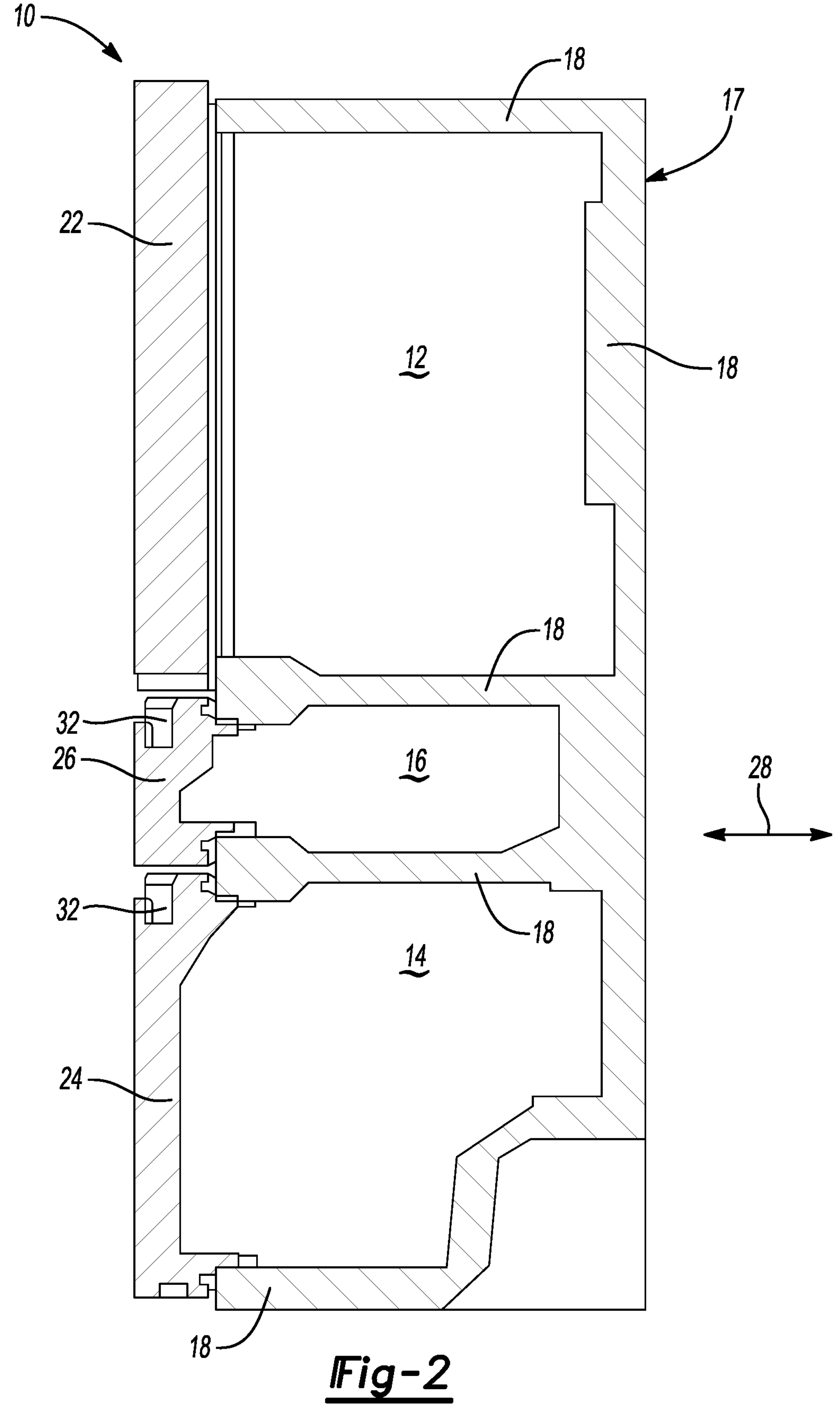
FIG. 2 is a cross-sectional view taken along line 2-2 in FIG. 1 of the French-Door Bottom Mount type refrigerator appliance.

Referring to FIGS. 1 and 2, generally a refrigerator 10 of the French-Door Bottom Mount type is illustrated. However, it should be understood that this disclosure could apply to any type of refrigerator, such as a side-by-side, two-door bottom mount, or a top-mount type. As shown in FIGS. 1 and 2, the refrigerator 10 may have a first internal cavity, internal storage chamber, or fresh food compartment 12 configured to refrigerate and not freeze consumables within the fresh food compartment 12. The refrigerator 10 may have a second internal cavity, internal storage chamber, or freezer compartment 14 configured to freeze consumables within the freezer compartment 14 during normal use. The refrigerator 10 may have a third internal cavity, internal storage chamber, or convertible compartment 16. The convertible compartment 16 may be disposed between the fresh food compartment 12 and freezer compartment 14. The convertible compartment 16 is convertible between operating as a fresh food compartment that is configured to refrigerate and not freeze consumables and a freezer compartment that is configured to freeze consumables.

The refrigerator 10 includes a cabinet 17 that includes walls 18 that define the fresh food compartment 12, the freezer compartment 14, and the convertible compartment 16. The refrigerator 10 may have one or more doors 22, 24, 26 that provide selective access to the interior volume (e.g., the fresh food compartment 12, freezer compartment 14, or convertible compartment 16) of the refrigerator 10 where consumables may be stored. As shown, the fresh food compartment 12 doors are designated 22, the freezer compartment 14 door is designated 24, and the convertible compartment 16 door is designated as 26. It may also be shown that the fresh food compartment 12 may only have one door 22. The doors 22 may be rotatably secured to the walls by one or more hinges. Doors 24, 26 may be slidable into and out of the interior volume of the refrigerator 10 along direction 28 via tracks. Direction 28 may be a horizontal direction.

The refrigerator 10, or more specifically the cabinet 17, includes an outer shell, frame, or housing that comprises several exterior panels or walls. The outer shell, frame, or housing that comprises several exterior panels or walls may also be referred to as the refrigerator cabinet wrapper. The exterior walls may include a rear or back wall, a top wall, a bottom wall, and two side walls. An insulating material, such as an insulating foam, may be disposed between each exterior wall and an adjacent corresponding interior wall in order reduce the heat transfer from the ambient surroundings to the fresh food compartment 12, the freezer compartment 14, and convertible compartment 16 which increases the efficiency of the refrigerator 10. Each exterior wall, adjacent corresponding interior wall, and the insulating material disposed between each exterior wall and adjacent corresponding interior wall may collectively be referred to as a single wall of the cabinet 17 of the refrigerator 10.

The doors 22 may each include an exterior panel and an interior panel that is disposed on an internal side of the respective exterior panel of each door 22. The interior panels may be configured to face the fresh food 12 compartment when the doors 22 are in closed positions. The interior panel may more specifically be a door liner. An insulating material, such as an insulating foam, may be disposed between the exterior panel and interior panel of each door 22 in order reduce the heat transfer from the ambient surroundings and increase the efficiency of the refrigerator.

The doors 22 may also include storage bins that are able to hold smaller food items or containers. The storage bins may be secured to the interior panels of each door 22. Alternatively, the storage bins may be integrally formed within or defined by the interior panels of each door 22. In yet another alternative, a portion of the storage bins may be secured to the interior panels of each door, while another portion of the storage bins may be integrally formed within or defined by the interior panels of each door 22. The storage bins may include shelves (e.g., a lower surface upon, which a food item or container may rest upon) that extend from back surfaces of the interior panels of each door 22.

It is generally known that the freezer compartment 14 is typically kept at a temperature below the freezing point of water, and the fresh food compartment 12 is typically kept at a temperature above the freezing point of water and generally below a temperature of from about 35° F. to about 50° F., more typically below about 38° F. The convertible compartment 16 is convertible between being kept at the same or similar temperature as the fresh food compartment 12 or at the same or similar temperature as the freezer compartment 14.

The refrigerator 10 may also have a water inlet that is fastened to and in fluid communication with a household water supply of potable water. Typically, the household water supply connects to a municipal water source or a well. The water inlet may be fluidly engaged with one or more of a water filter, a water reservoir, and a refrigerator water supply line. The refrigerator water supply line may include one or more nozzles and one or more valves. The refrigerator water supply line may supply water to one or more water outlets; typically one outlet for water is in the dispensing area 30 and another to an ice tray. The refrigerator 10 may also have a control board or controller that sends electrical signals to the one or more valves when prompted by a user that water is desired or if an ice making cycle is required.

The refrigerator 10 includes a refrigeration loop or circuit that is configured to cool the air the within the fresh food compartment 12, the freezer compartment 14, and convertible compartment 16. The refrigeration loop or circuit may also be referred to as a refrigerant loop or circuit. The refrigeration loop or circuit includes at least a compressor, an evaporator that cools air being delivered to the fresh food compartment 12, the freezer compartment 14, and convertible compartment 16, a condenser that rejects heat to ambient surroundings, and an expansion device, such as a thermal expansion valve. The refrigeration loop or circuit may also include an accumulator. The accumulator may be located between the evaporator and the compressor. The accumulator prevents liquid refrigerant that did not evaporate in the evaporator from flowing into the compressor. The refrigeration loop or circuit includes lines or tubes that are configured to transport the refrigerant between the evaporator, compressor, condenser, thermal expansion valve, and accumulator. The evaporator and condenser are each heat exchangers (e.g., tube and fin heat exchangers).

Fans may be utilized to direct air across the evaporator and the condenser to facilitate exchanging heat. The compressor and the fans may be connected to a controller. Sensors that measure the air temperature and/or humidity within the fresh food compartment 12, the freezer compartment 14, and convertible compartment 16 may be in communication with the controller. The controller may be configured to operate the compressor, fans, etc. in response to the air temperature and/or humidity within the within the fresh food compartment 12, the freezer compartment 14, and convertible compartment 16 being less than a threshold.

The controller may be part of a larger control system and may be controlled by various other controllers throughout the refrigerator 10, and one or more other controllers can collectively be referred to as a "controller" that controls various functions of the refrigerator 10 in response to inputs or signals to control functions of the refrigerator 10. The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the refrigerator 10.

Figure 3:
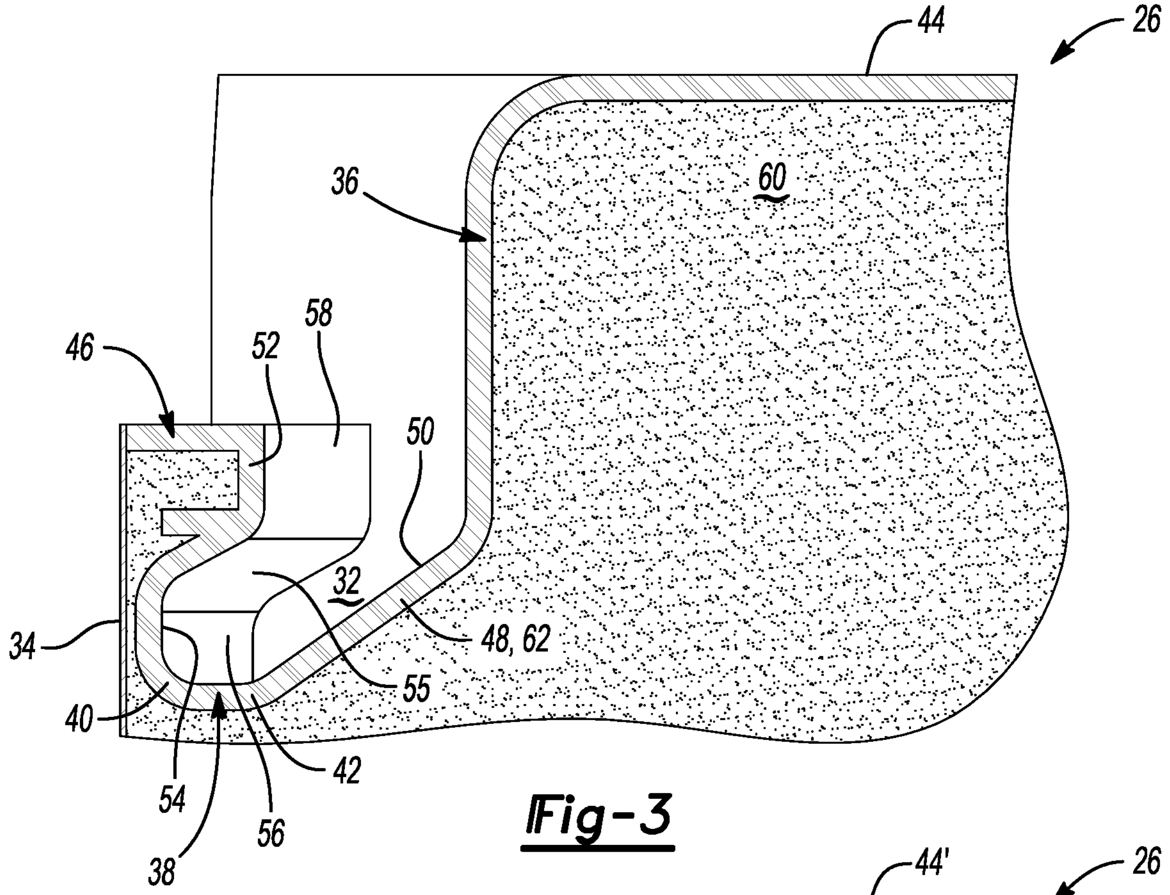
FIG. 3 is a magnified cross-sectional view taken along line 2-2 in FIG. 1 illustrating a first configuration of a pocket handle for a slidable door of the refrigerator appliance.

Referring to FIGS. 1-3, a first configuration of a pocket handle 32 for one or more of the slidable doors (e.g., door 24 and door 26) is illustrated. Hereinafter, the pocket handle 32 will be described with respect to door 26. However, it should be understood that the description of the pocket handle 32 with respect to door 26 may be applied in the same manner to door 24.

The door 26 includes a front panel 34, a recessed or offset panel 36, and a ledge 38. The front panel 34 may be referred to as the first external panel while the offset panel 36 may be referred to as the second external panel. The ledge 38 extends inward relative to the front panel 34. The ledge 38 extends from a front end 40 to a rear end 42. The front end 40 of the ledge 38 is proximate to the front panel 34. The offset panel 36 is offset from the front panel 34. The offset panel 36 extends upward from the rear end 42 of the ledge 38 to a top 44 of the door 26.

The door 26 further includes a protrusion 46 extending upward from the front end 40 of the ledge 38 and along the front panel 34. A front side of the protrusion 46 forms a portion of front panel 34. The pocket handle 32 is defined above the ledge 38. The pocket handle 32 is also defined between the protrusion 46 and the offset panel 36. At least a portion of pocket handle 32 forms parallelepiped shape. A lower end 48 of the offset panel 36 extends toward or is sloped toward the front panel 34 such that a back side 50 of the pocket handle 32 extends or tapers away from the offset panel 36 and toward the front panel 34 along the lower end 48 of the offset panel 36. An upper end 52 of the protrusion 46 extends toward or is sloped toward the offset panel 36 such that a front side 54 of the pocket handle 32 extends or tapers away from the front panel 34 and toward the offset panel 36 along the upper end 52 of the protrusion 46. More specifically, an internal side of the protrusion 46 may include a sloped surface 55 that extends between first and second vertical surfaces 56, 58 such that the front side 54 of the pocket handle 32 extends or tapers away from the front panel 34 and toward the offset panel 36.

An insulating material 60 is disposed on an opposing side of the offset panel 36 relative to the pocket handle 32 and on an opposing side of the ledge 38 relative to the pocket handle 32. The insulating material 60 may also be disposed in at least a portion of the protrusion 46. The lower end 48 of the offset panel 36 extends along a slope 62 directly to the ledge 38, which increases the volume of the insulating material 60 that surrounds the pocket handle 32. More particularly, the volume of the insulating material 60 is increased between the pocket handle 32 and the adjacent compartment (e.g., the freezer compartment 14 or the convertible compartment 16) that is cooled to a temperature that is less than the ambient temperature of the air surrounding the refrigerator 10. Increasing the volume of the insulating material 60 that surrounds the pocket handle 32 in turn decreases the risk of condensation collecting within the pocket handle 32 and helps to maintain the temperature of the surfaces forming the pocket handle 32 (e.g., the internal surfaces of the front panel 34, offset panel 36, and ledge 38) at or close to the ambient temperature of the air surrounding the refrigerator 10 so that condensation does not form on the of the surfaces forming the pocket handle 32.

Figure 4:
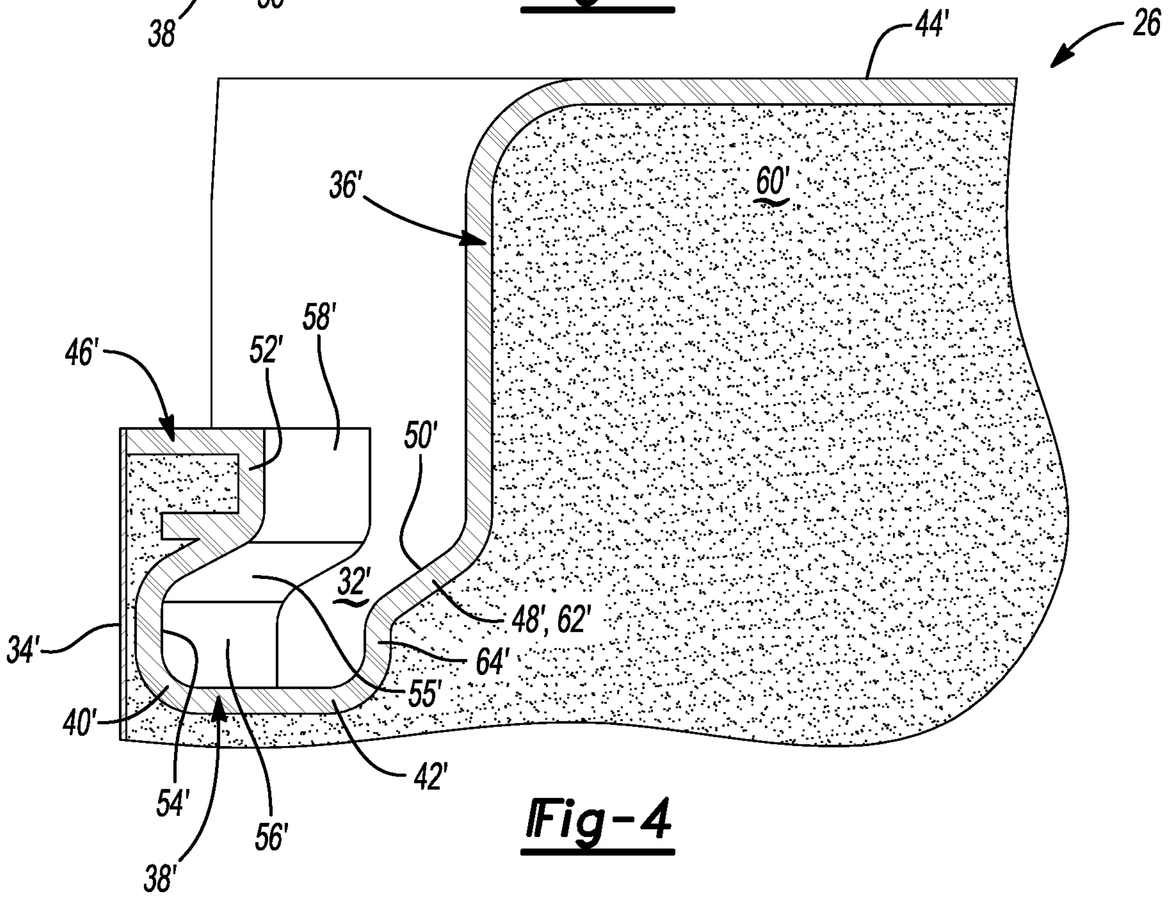
FIG. 4 is a magnified cross-sectional view taken along line 2-2 in FIG. 1 illustrating a second configuration of the pocket handle.

Referring to FIG. 4, a second configuration of a pocket handle 32' for one or more of the slidable doors (e.g., door 24 and door 26) is illustrated. Hereinafter, the pocket handle 32' will be described with respect to door 26. However, it should be understood that the description of the pocket handle 32' with respect to door 26 may be applied in the same manner to door 24.

The door 26' includes a front panel 34', a recessed or offset panel 36', and a ledge 38'. The front panel 34' may be referred to as the first external panel while the offset panel 36' may be referred to as the second external panel. The ledge 38' extends inward relative to the front panel 34'. The ledge 38' extends from a front end 40' to a rear end 42'. The front end 40' of the ledge 38' is proximate to the front panel 34'. The offset panel 36' is offset from the front panel 34'. The offset panel 36' extends upward from the rear end 42' of the ledge 38' to a top 44' of the door 26.

The door 26 further includes a protrusion 46' extending upward from the front end 40' of the ledge 38' and along the front panel 34'. A front side of the protrusion 46' forms a portion of front panel 34'. The pocket handle 32' is defined above the ledge 38'. The pocket handle 32' is also defined between the protrusion 46' and the offset panel 36'. At least a portion of pocket handle 32' forms parallelepiped shape. A lower end 48' of the offset panel 36' extends toward or is sloped toward the front panel 34' such that a back side 50' of the pocket handle 32' extends or tapers away from the offset panel 36' and toward the front panel 34' along the lower end 48' of the offset panel 36'. An upper end 52' of the protrusion 46' extends toward or is sloped toward the offset panel 36' such that a front side 54' of the pocket handle 32' extends or tapers away from the front panel 34' and toward the offset panel 36' along the upper end 52' of the protrusion 46'. More specifically, an internal side of the protrusion 46' may include a sloped surface 55' that extends between first and second vertical surfaces 56', 58' such that the front side 54' of the pocket handle 32' extends or tapers away from the front panel 34' and toward the offset panel 36'.

An insulating material 60' is disposed on an opposing side of the offset panel 36' relative to the pocket handle 32' and on an opposing side of the ledge 38' relative to the pocket handle 32'. The insulating material 60' may also be disposed in at least a portion of the protrusion 46'. The lower end 48' of the offset panel 36' extends along a slope 62' to a vertical wall 64'. The vertical wall 64' in turn extends to the ledge 38'. This configuration increases the volume of the insulating material 60' that surrounds the pocket handle 32'. More particularly, the volume of the insulating material 60' is increased between the pocket handle 32' and the adjacent compartment (e.g., the freezer compartment 14 or the convertible compartment 16) that is cooled to a temperature that is less than the ambient temperature of the air surrounding the refrigerator 10. Increasing the volume of the insulating material 60' that surrounds the pocket handle 32' in turn decreases the risk of condensation collecting within the pocket handle 32' and helps to maintain the temperature of the surfaces forming the pocket handle 32' (e.g., the internal surfaces of the front panel 34', offset panel 36', and ledge 38') at or close to the ambient temperature of the air surrounding the refrigerator 10 so that condensation does not form on the of the surfaces forming the pocket handle 32'.

It should be understood that any component having a callout number in FIG. 4 that includes a prime symbol (') should be construed as having the same structure, subcomponents, and functionality as a component illustrated in FIG. 3 that includes the same callout number but without the prime symbol, unless otherwise stated or illustrated herein.

Figure 5:
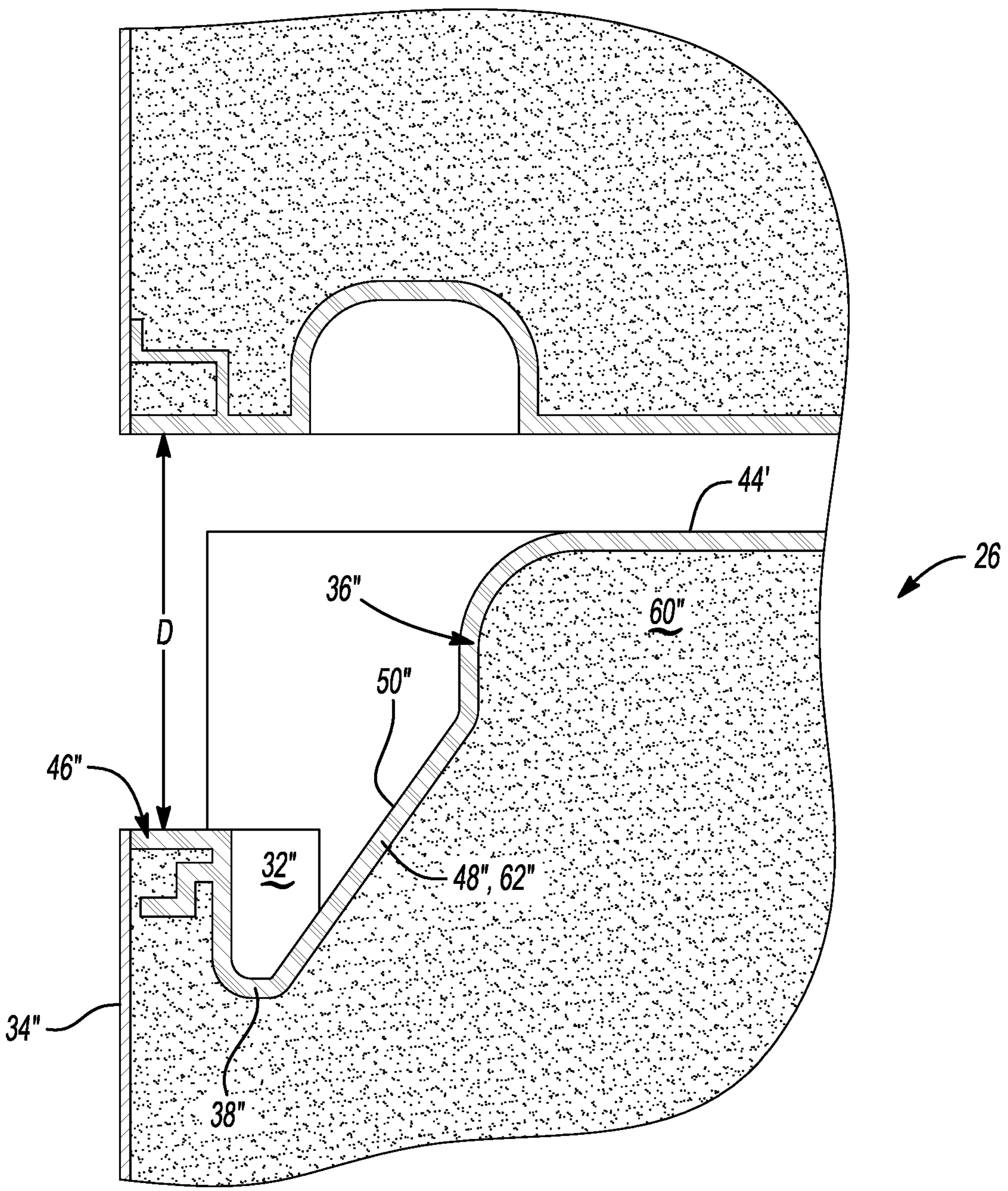
FIG. 5 is a magnified cross-sectional view taken along line 2-2 in FIG. 1 illustrating a third configuration of the pocket handle.

Referring to FIG. 5, a third configuration of a pocket handle 32" for one or more of the slidable doors (e.g., door 24 and door 26) is illustrated. Hereinafter, the pocket handle 32" will be described with respect to door 26. However, it should be understood that the description of the pocket handle 32" with respect to door 26 may be applied in the same manner to door 24.

The door 26" includes a front panel 34", a recessed or offset panel 36", and a ledge 38". The front panel 34" may be referred to as the first external panel while the offset panel 36" may be referred to as the second external panel. The ledge 38" extends inward relative to the front panel 34". The ledge 38" may be a rounded fillet that extends between the front panel 34" and the offset panel 36". The offset panel 36" is offset from the front panel 34". The offset panel 36" extends upward from a rear end of the ledge 38" to a top 44" of the door 26.

The door 26 further includes a protrusion 46" extending upward from the front end of the ledge 38" and along the front panel 34". A front side of the protrusion 46" forms a portion of front panel 34". The pocket handle 32" is defined above the ledge 38". The pocket handle 32" is also defined between the protrusion 46" and the offset panel 36". A lower end 48" of the offset panel 36" extends toward or is sloped toward the front panel 34" such that a back side 50" of the pocket handle 32" extends or tapers away from the offset panel 36" and toward the front panel 34" along the lower end 48" of the offset panel 36".

An insulating material 60" is disposed on an opposing side of the offset panel 36" relative to the pocket handle 32" and on an opposing side of the ledge 38" relative to the pocket handle 32". The insulating material 60" may also be disposed in at least a portion of the protrusion 46". The lower end 48" of the offset panel 36" extends along a slope 62" to the ledge 38". This configuration increases the volume of the insulating material 60" that surrounds the pocket handle 32". More particularly, the volume of the insulating material 60" is increased between the pocket handle 32" and the adjacent compartment (e.g., the freezer compartment 14 or the convertible compartment 16) that is cooled to a temperature that is less than the ambient temperature of the air surrounding the refrigerator 10.

Increasing the volume of the insulating material 60" that surrounds the pocket handle 32" in turn decreases the risk of condensation collecting within the pocket handle 32" and helps to maintain the temperature of the surfaces forming the pocket handle 32" (e.g., the internal surfaces of the front panel 34", offset panel 36", and ledge 38") at or close to the ambient temperature of the air surrounding the refrigerator 10 so that condensation does not form on the of the surfaces forming the pocket handle 32".

The slope 62" and a gap or distance D between the top of the protrusion 46" and a corresponding component disposed above the door 26 (e.g., a door endcap or hinge bracket) may be adjusted to desirable values to ensure that sufficient air is flowing into the pocket handle 32".

Test data has shown that: (i) the percentage reduction in condensation risk for a baseline of the new design of the pocket handle 32" relative to an existing design and where the value of the distance D is 47.5 mm is 40% if the pocket handle 32" is part of the door 26 to the convertible compartment 16 and is 59% if the pocket handle 32" is part of the door 24 to the freezer compartment 14; (ii) the percentage reduction in condensation risk for the new design of the pocket handle 32" relative to the existing design and where the value of the distance D is 32 mm is 96% if the pocket handle 32" is part of the door 26 to the convertible compartment 16 and is 41% if the pocket handle 32" is part of the door 24 to the freezer compartment 14; (iii) the percentage reduction in condensation risk for the new design of the pocket handle 32" relative to the existing design and where the value of the distance D is 35 mm is 70% if the pocket handle 32" is part of the door 26 to the convertible compartment 16 and is 41% if the pocket handle 32" is part of the door 24 to the freezer compartment 14; and (iv) the percentage reduction in condensation risk for the new design of the pocket handle 32" relative to the existing design and where the value of the distance D is 40 mm is 66% if the pocket handle 32" is part of the door 26 to the convertible compartment 16 and is 65% if the pocket handle 32" is part of the door 24 to the freezer compartment 14. Therefore, the new design of the pocket handle 32" relative to the existing design where the value of the distance D is 40 mm has the most benefit in reducing condensation if the new design for the pock handle 32" is utilized for both of the doors 24, 26.

It should be understood that any component having a callout number in FIG. 5 that includes a double prime symbol (") should be construed as having the same structure, subcomponents, and functionality as a component illustrated in FIG. 3 that includes the same callout number but without the prime symbol, unless otherwise stated or illustrated herein.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A refrigerator appliance comprising:

a cabinet defining an internal cavity;

a door secured to the cabinet and configured to slide into an out of the internal cavity, the door having (i) a front panel, (ii) a ledge extending inward relative to the front panel, (iii) an offset panel extending upward from a rear end of the ledge to a top of the door, and (iv) a protrusion extending upward from a front end of the ledge and the front panel, wherein (a) a pocket handle is defined above the ledge and between the protrusion and the offset panel, (b) a lower end of the offset panel is sloped toward the front panel such that a back side of the pocket handle tapers away from the offset panel and toward the front panel along the lower end of the offset panel (c) an upper end of the protrusion is sloped toward the offset panel such that a front side of the pocket handle tapers away from the front panel and toward the offset panel along the upper end of the protrusion, (d) at least a portion of the pocket handle forms a parallelepiped shape, and (e) a sloped surface of the protrusion is parallel to a slope of the lower end;

a projection disposed between a top and a bottom of the protrusion and extending toward the front panel; and an insulation material extending around the projection and between the projection and the front panel.

2. The refrigerator appliance of claim 1, further comprising the insulating material disposed (i) on an opposing side of the offset panel relative to the pocket handle and (ii) on an opposing side of the ledge relative to the pocket handle.

3. The refrigerator appliance of claim 1, wherein a front side of the protrusion forms a portion of front panel.

4. The refrigerator appliance of claim 1, wherein the lower end of the offset panel extends along a slope directly to the ledge.

5. The refrigerator appliance of claim 1, wherein the lower end of the offset panel extends along a slope to a vertical wall that extends to the ledge.

6. The refrigerator appliance of claim 1, wherein an internal side of the protrusion includes the sloped surface that extends between first and second vertical surfaces.

7. The refrigerator appliance of claim 1, wherein the insulation material is an insulating foam.

8. A door for a refrigerator appliance comprising:

a first external panel;

a ledge extending inward relative to the first external panel;

a second external panel (i) offset from the first external panel and (ii) extending upward from the ledge to a top of the door;

a protrusion extending upward from the ledge along the first external panel, wherein (i) a pocket handle is defined above the ledge and between the protrusion and the second external panel, (ii) an upper end of the protrusion extends toward the second external panel such that a front side of the pocket handle extends away from the first external panel and toward the second external panel, (iii) a lower end of the second external panel extends toward the first external panel such that a back side of the pocket handle extends away from the second external panel and toward the first external panel, and (iv) the lower end of the second external panel extends along a slope to a vertical wall that extends to the ledge; and a projection disposed between a top and a bottom of the protrusion and extending toward the first external panel; and an insulation material extending around the projection and between the projection and the first external panel.

9. The door of claim 8, further comprising the insulating material disposed (i) on an opposing side of the second external panel relative to the pocket handle and (ii) on an opposing side of the ledge relative to the pocket handle.

10. The door of claim 8, wherein a front side of the protrusion forms a portion of the first external panel.

11. The door of claim 8, wherein an internal side of the protrusion includes a sloped surface that extends between first and second vertical surfaces.

12. A refrigerator appliance comprising;

a cabinet defining an internal cavity;

a door secured to the cabinet and configured to slide into an out of the internal cavity, the door having (i) a front panel, (ii) a ledge extending inward relative to the front panel, (iii) an offset panel extending upward from a rear end of the ledge to a top of the door, and (iv) a protrusion extending upward from a front end of the ledge and the front panel, wherein (a) a pocket handle is defined above the ledge and between the protrusion and the offset panel, (b) a lower end of the offset panel is sloped toward the front panel such that a back side of the pocket handle tapers away from the offset panel and toward the front panel along the lower end of the offset panel, (c) an upper end of the protrusion is sloped toward the offset panel such that a front side of the pocket handle tapers away from the front panel and toward the offset panel along the upper end of the protrusion, and (d) the lower end of the offset panel extends along a slope to a vertical wall that extends to the ledge;

a projection disposed between a top and a bottom of the protrusion and extending toward the front panel; and an insulation material extending around the projection and between the projection and the front panel.

13. The refrigerator appliance of claim 12, wherein the insulating material is disposed on an opposing side of the offset panel relative to the pocket handle.

14. The refrigerator appliance of claim 12, wherein the insulating material is disposed on an opposing side of the ledge relative to the pocket handle.

15. The refrigerator appliance of claim 12, wherein a front side of the protrusion forms a portion of the front panel.

16. The refrigerator appliance of claim 12, wherein an internal side of the protrusion includes a sloped surface that extends between first and second vertical surfaces.

17. The refrigerator appliance of claim 12, wherein at least a portion of the pocket handle forms a parallelepiped shape.

18. The refrigerator appliance of claim 12, wherein a sloped surface of the protrusion is parallel to a slope of the lower end.

19. The refrigerator appliance of claim 12, wherein the insulation material is an insulating foam.

* * * * *